(No Model.)
H. A. THOMPSON.
PROTECTOR FOR COW MILKERS.
No. 317,045. Patented May 5, 1885.
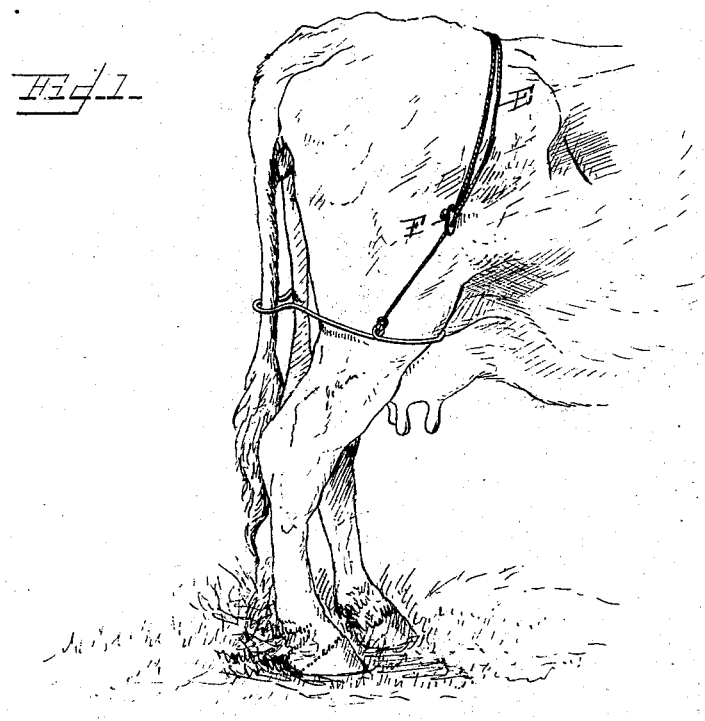
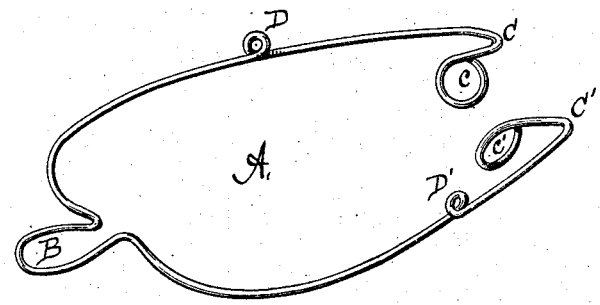
WITNESSES
F. L. Durand
Jas. L. Falbey
INVENTOR
H. A. Thompson
H. F. Ennis, Attorney

UNITED STATES PATENT OFFICE.

HENRY ARTEMAS THOMPSON, OF FARMINGTON, MAINE.

PROTECTOR FOR COW-MILKERS.

SPECIFICATION forming part of Letters Patent No. 317,045, dated May 5, 1885.

Application filed October 18, 1884. (No model.)

*To all whom it may concern:*

Be it known that I, HENRY A. THOMPSON, a citizen of the United States, residing at Farmington, in the county of Franklin and State of Maine, have invented certain new and useful Improvements in Protectors for Cow-Milkers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to devices for protecting milkers during the operation of milking cows; and the object is to provide a clamp to hold the hind legs of the animal in position and secure the tail, so as to prevent its being switched about; and to these ends the novelty consists in the construction of the device, as will be hereinafter more fully described, and particularly pointed out in the claim.

In the accompanying drawings similar letters of reference indicate like parts of the invention.

Figure 1 is a perspective elevation of the device as it appears when it is in use upon the animal, and Fig. 2 is a similar view detached.

A is a wire frame, made of a single piece of steel wire of suitable thickness and size to correspond to the animal.

B is a U-shaped link, in which the tail is held to prevent the animal swinging it about, and C C' are the hooked-shaped ends, which engage the animal's legs to assist in holding the frame in place, their ends being protected by rings c c', to prevent injury to the animal.

D D' are loops, one on each side of the frame A, and one end of a cord, E, is made fast to the loop D, said cord passing over the back of the animal, thence through the link D', and back again, terminating in a cleat, F, by means of which the device may be adjusted to the proper height, and also adjusted to different animals. The hooked end C' is longer than its opposite end C, so as to allow the cow to stand in the position shown in Fig. 1, which gives the operator free access to the udder.

The advantages and great convenience of the invention will be readily understood and appreciated by those interested in this art.

Having thus fully described my invention, what I claim as new and useful, and desire to secure by Letters Patent of the United States, is—

The frame A, made of a single piece of spring-wire, and provided with the link B, protected hooked-shaped ends C C', and loops D D', in combination with the adjusting-cord E, having cleat F, constructed and arranged substantially as shown and described.

In testimony whereof I affix my signature in presence of two witnesses.

HENRY ARTEMAS THOMPSON.

Witnesses:
JOSIAH H. THOMPSON,
GEO. W. WHEELER.